United States Patent [19]

Dew et al.

[11] Patent Number: 5,124,855
[45] Date of Patent: Jun. 23, 1992

[54] DISK FILE WITH ISOLATION MOUNT

[75] Inventors: Graham N. Dew, Winchester; Michael W. Hall, Hampton; Michael R. Hatchett, Eastleigh; Anthony R. Hearn, South Wonston; Michael G. Taylor, Hedge End, all of England

[73] Assignee: International Business Machines Corporation, Armonk, N.Y.

[21] Appl. No.: 529,823

[22] Filed: May 29, 1990

[30] Foreign Application Priority Data

Feb. 15, 1990 [GB] United Kingdom ................ 9003470

[51] Int. Cl.$^5$ .................... G11B 33/14; G11B 23/02
[52] U.S. Cl. ................ 360/97.02; 360/98.01; 360/137
[58] Field of Search ................ 360/97.02, 98.01, 137

[56] References Cited

U.S. PATENT DOCUMENTS

| 4,553,183 | 11/1985 | Brown et al. | 360/97.02 |
| 4,831,476 | 5/1989 | Pisczak | 360/137 X |
| 4,908,715 | 3/1990 | Krum et al. | 360/97.02 |
| 4,979,062 | 12/1990 | Stefansky et al. | 360/97.02 |
| 5,004,207 | 4/1991 | Ishikawa et al. | 360/97.02 X |

*Primary Examiner*—John H. Wolff
*Attorney, Agent, or Firm*—Richard E. Billion

[57] ABSTRACT

A disk file comprises a head disk enclosure 1 connected to a support frame by a plurality of isolation mounts. Each isolation mount comprises a constrained layer flexure 23 which is rigidly attached at both ends to a bracket 25 of the support frame. Located in an aperture in the constrained layer flexure is a resilient grommet 24. This grommet supports a bolt 27 which passes through the grommet and into the head-disk enclosure casting.

9 Claims, 5 Drawing Sheets

DISK FILE WITH ISOLATION MOUNT

FIELD OF THE INVENTION

This invention relates to disk files and more particularly to an isolation mount for a head-disk enclosure within a disk file.

BACKGROUND OF THE INVENTION

It is common for sensitive electrical apparatus, such as computer disk drives, to be shock mounted within a frame. The shock mounting reduces the possibility of damage from a sudden impact, such as dropping the device onto a hard surface. Some devices require isolation mounts, which not only protect against shocks and other high frequency vibrations, but also against lower frequency vibrations as well. These mounts must additionally be able to cope with internally generated vibrations, for example those due to the access motion of a disk file actuator.

Associated with a shock or isolation mount is a mount frequency, which is the natural frequency of oscillation of the mounted device due to the elastic restoring force of the mounts. For a device driven by input oscillations of a given frequency and amplitude, the ratio of the amplitude of the output response oscillations to that of the input oscillations is referred to as the gain. The general variation of gain with frequency (termed the transfer function) is well known for such systems. For input oscillations at much less than the natural (in our case mount) frequency, the gain is approximately unity—i.e the system behaves as if the mounting were simply a rigid connection. Then, as the driving input frequency becomes comparable with the mount frequency, resonance occurs and the gain becomes large. Finally, above the mount frequency resonance, the gain falls beneath unity, and thereafter the gain continues to decrease with increasing frequency.

In the design of a shock or isolation mount, adjustment of the mount frequency can be used to control vibration at different frequencies. Typically such mounts include some form of damping to further reduce motion, and this can also affect the height, width, and exact position of the mount frequency resonance.

One common type of prior art shock mount is described in PCT application WO 88/09551. In this design, a rubber grommet is placed around a cylindrical projection of the head-disk enclosure (or alternatively around a bolt that is screwed part way into the head-disk enclosure). The grommet is then held within the support frame, to provide a shock mount for the head-disk enclosure. Typically there are three or four such shock mounts connecting the head-disk enclosure to the support frame. A slight variation of this method is disclosed in U.S. Pat. No. 4812932, which describes a grommet with a spring constant that is arranged to vary significantly with displacement. U.S. Pat. No. 4683520 discloses a shock mount which again uses a grommet, but instead of having the grommet held directly by the frame, attaches it to a cantilevered extension of the frame.

A somewhat different mounting system for unspecified electrical equipment is disclosed in Canadian patent 788873. This uses a panel of laminar material including a damping layer as a support structure for apparatus. Resilient grommets are used to attach the panel to a frame, and apparatus to the panel. The use of the panel enhances the isolation properties of the mount.

DISCLOSURE OF THE INVENTION

The shock mounts of the prior art have not achieved compactness and consistent, low mount frequencies that are relatively insensitive to temperature variation.

Accordingly, the invention provides a magnetic disk file including: a frame; a head-disk enclosure containing a disk stack assembly and an actuator; and a plurality of isolation mounts supporting said head-disk enclosure within said frame; said magnetic disk file being characterized in that each of said isolation mounts includes a constrained layer flexure.

The use of a constrained layer flexure offers a compact isolation mount with a very low mount frequency for the head-disk enclosure within a disk file. The low mount frequency offers good protection against high frequency vibrations, both those generated internally, for example by the motion of the actuator, and also those generated externally. Furthermore, the properties of this mount are relatively insensitive to temperature variations.

In the case where the actuator is a linear actuator, it is preferable that the constrained layer flexure is most pliant in a direction parallel to the access direction of the actuator. For an actuator controlled by a closed-loop servo system, it is also preferable that the mount frequency in the access direction of the head-disk enclosure is sufficiently low that vibrations at frequencies outside the bandwidth of the closed-loop servo system are attenuated by the isolation mounts. The mount frequency can be much higher in the plane orthogonal to the access direction, reducing the need for sway space in this plane. Although constrained layer flexures are particularly useful in a disk file with a linear actuator, there is no reason why they should not be employed in a disk file with a rotary actuator, in which case other orientations of mounts, and conceivably more than one type of mount, may be desirable.

Preferably, the flexure has a planar elongated form and may be attached to the frame by a rivet at each end. The preferred construction of the flexure comprises a layer of viscoelastic rubber sandwiched between two layers of steel, although other materials could be used. Preferably the flexure has an H-shaped frame, with an aperture located within the central cross-piece. Said H-shaped frame has additional cross-pieces top and bottom, each cross-piece having an inwardly turned tab which accommodates the rivets that attach the flexure to the frame. This effectively extends the length of the flexure, permitting a lower mount frequency to be obtained. However, flexures with different shapes, such as a disk-shaped diaphragm, could be also used.

It is also preferred that the isolation mount further includes a resilient grommet located within the aperture in the flexure central cross-piece. The head-disk enclosure is supported by a bolt that passes through the grommet, and the grommet includes a flange that lies between the flexure and the frame, so as to prevent the flexure and the frame coming into contact in the case of excessive displacement of the head-disk enclosure.

Typically, the grommet in each isolation mount would be made of rubber. The grommets make the mount more resistant to shocks, especially in a plane orthogonal to the access direction, and also act as a snubber to prevent buckling in the case of excessive motion in the access direction.

DESCRIPTION

Figure 1:
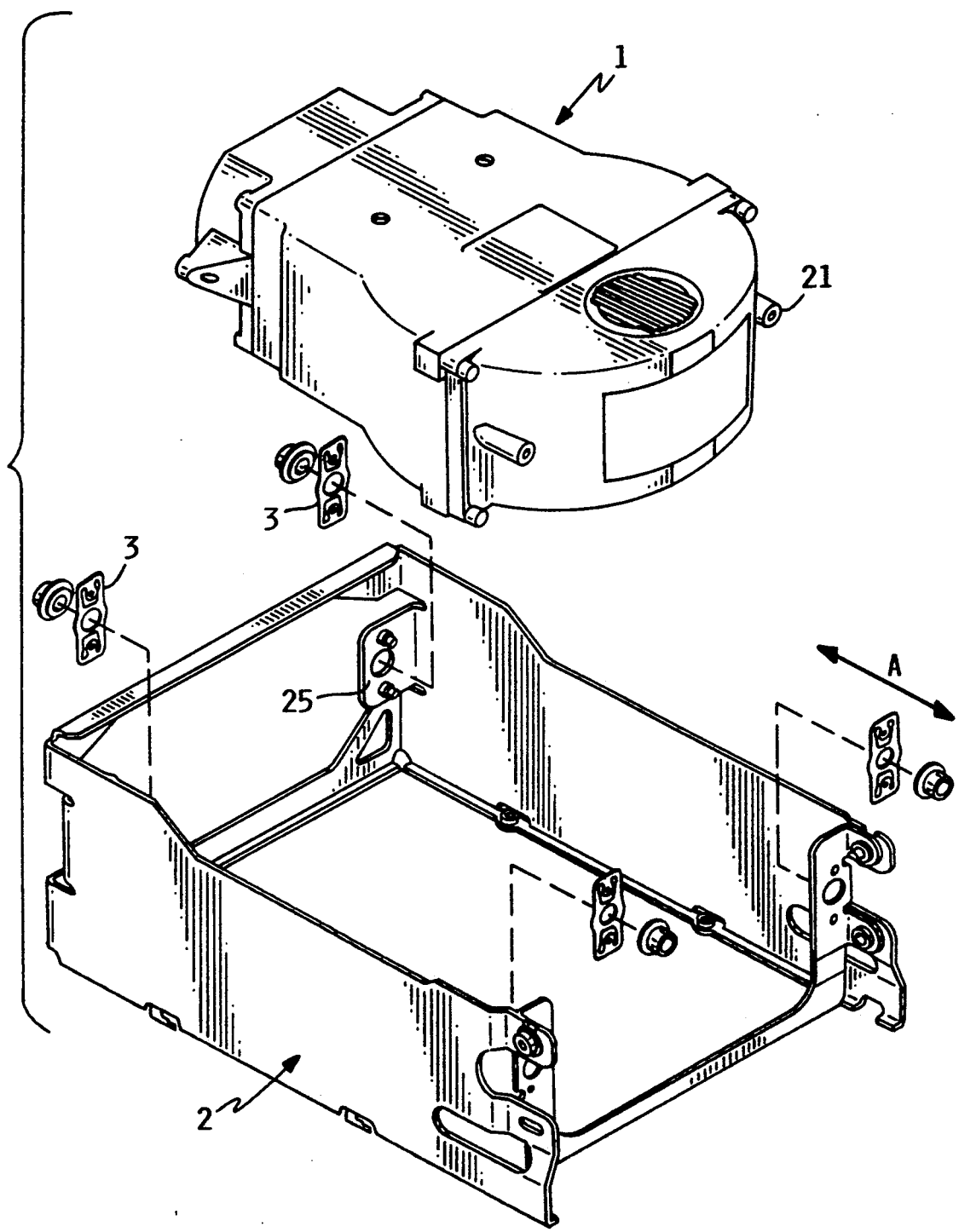
FIG. 1 shows an exploded view of a disk file according to the invention comprising a head-disk enclosure, a support frame, and isolation mounts.
Figure 2:
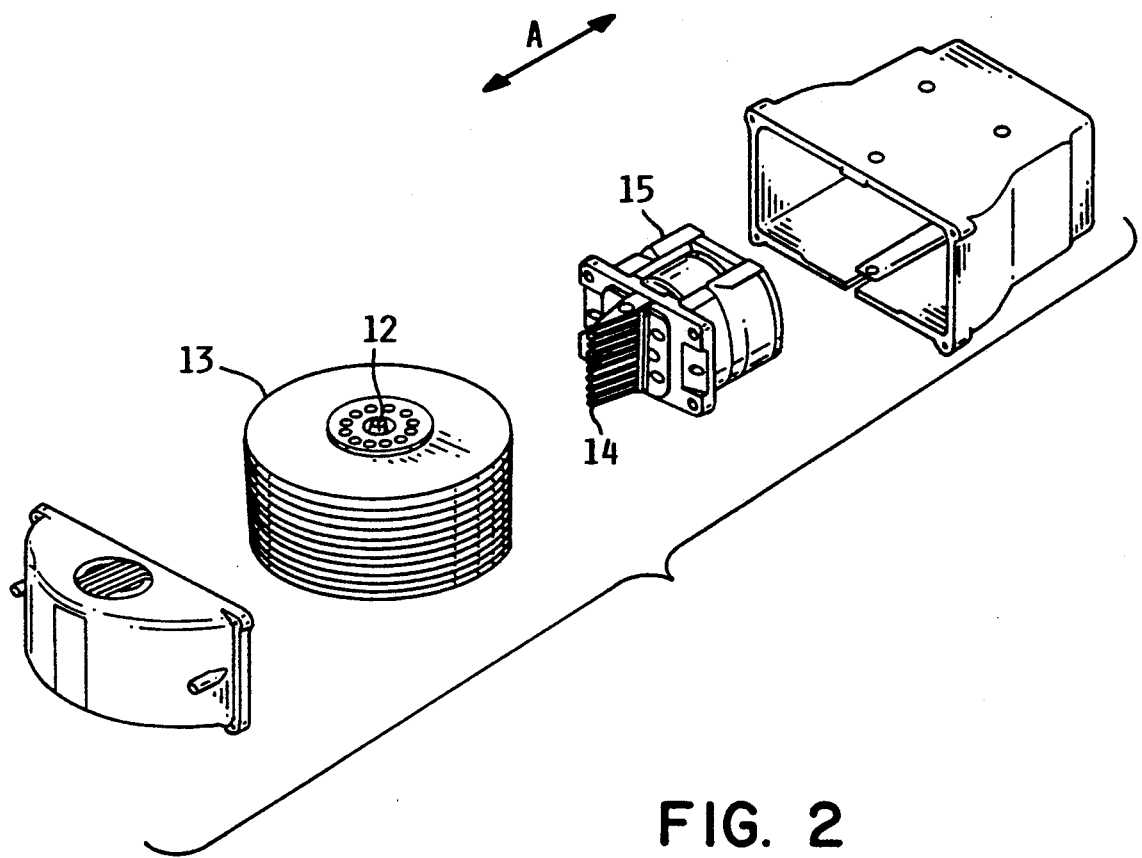
FIG. 2 shows an exploded view of the head-disk enclosure of FIG. 1.

FIG. 1 shows a head-disk enclosure 1 from a computer disk drive. The head-disk enclosure is supported inside frame 2 by four isolation mounts 3. The contents of the head-disk enclosure are shown in simplified form in FIG. 2, including rotatable data storage disks 13, read/write heads 14 for transferring data to and from the disks, and an actuator mechanism 15 for moving the heads across the disks. A servo control system is used to position the heads accurately over the disks. The disks are rotated about spindle 12 by an in-hub motor (not shown). The actuator of FIGS. 1 and 2 is a linear actuator; i.e. the read/write heads are moved in and out linearly across a disk radius. The direction of this motion, referred to as the access direction, is indicated by arrow A.

Figure 3:
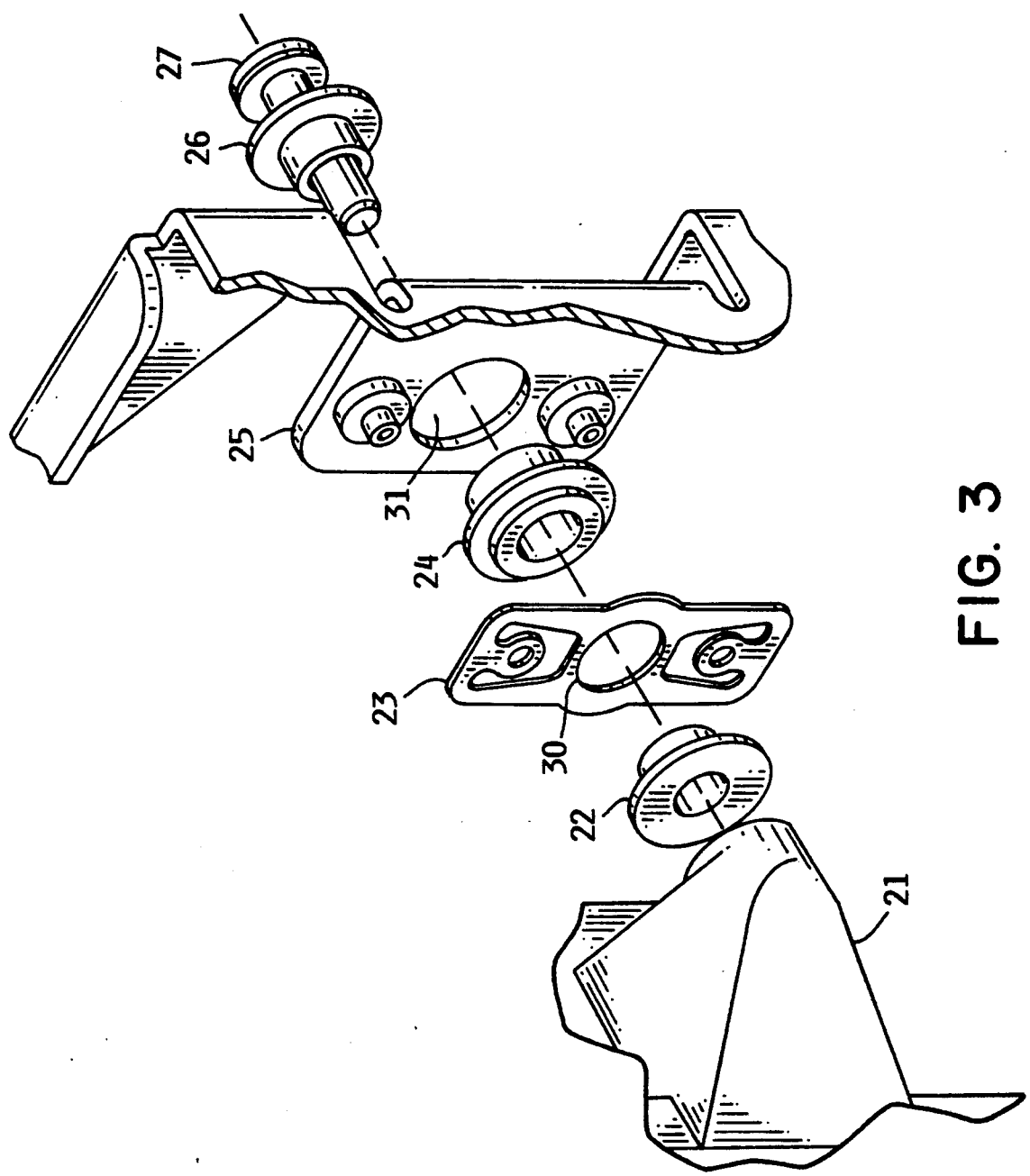
FIG. 3 shows an exploded detailed view of one of the isolation mounts of FIG. 1 in relation to adjacent portions of the head-disk enclosure and support frame.
Figure 4:
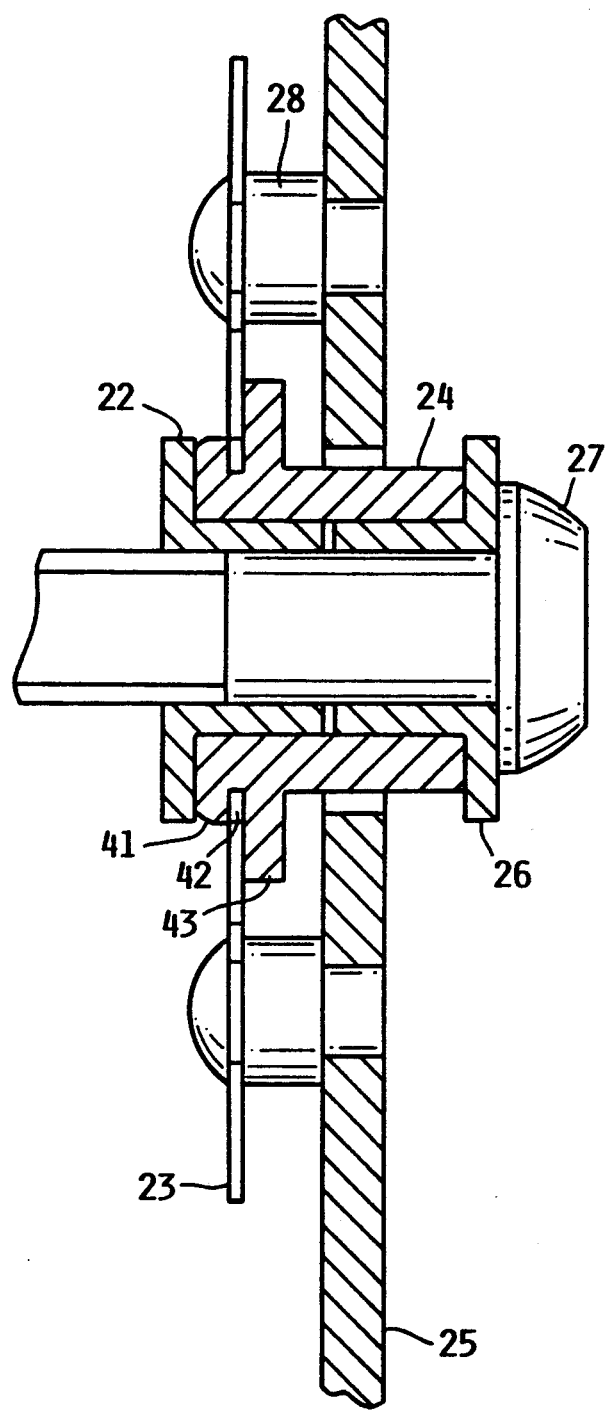
FIG. 4 shows a detailed cross-section through the isolation mount of FIG. 3.
Figure 5:
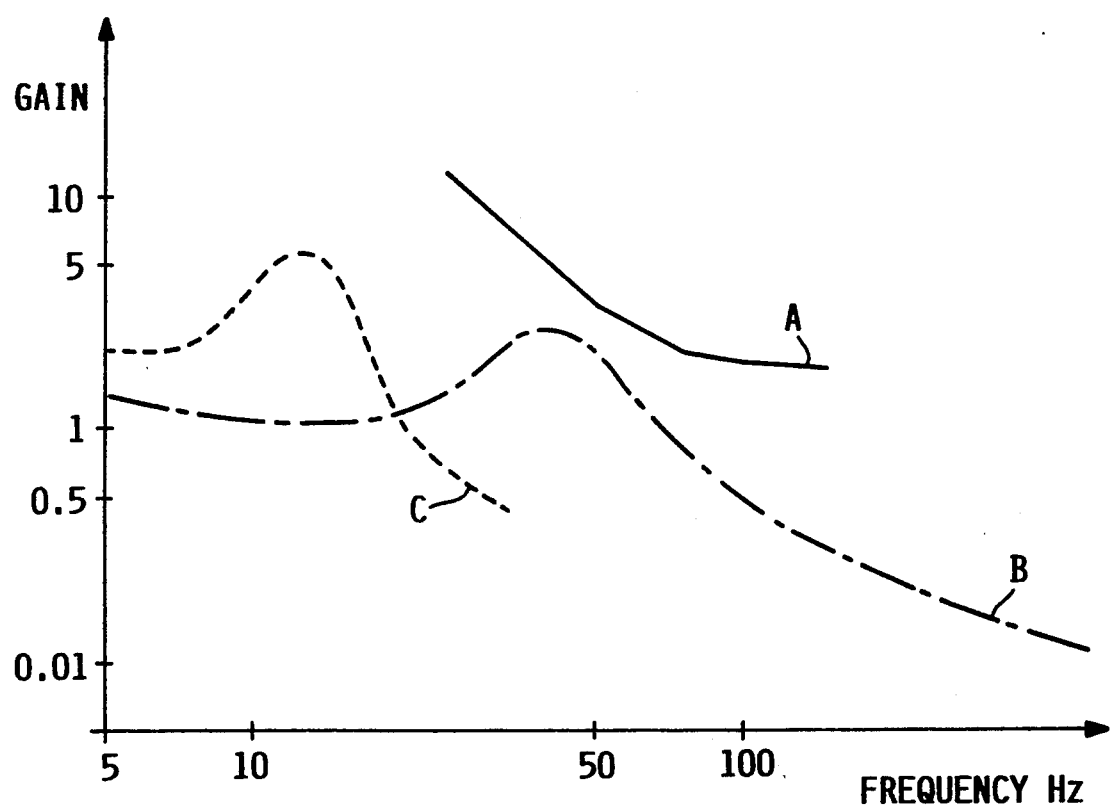
FIG. 5 compares the mount design specifications for maximum gain versus frequency with the gain of an isolation mount embodying the invention, and that of a prior art rubber grommet isolation mount.

FIGS. 3 and 4 show the isolation mounts of FIG. 1 in more detail. Bracket 25, which is part of frame 2, has three holes in it. The top and bottom holes are used for rivets 28 for attaching a constrained layer flexure 23 to bracket 25. The constrained layer flexure is essentially parallel to the bracket, and includes a hole 30 aligned with the central hole 31 in bracket 25. A rubber grommet or bush 24 is located in hole 30. The bush is a hollow cylindrical shape, with two flanges 41,43 and a groove 42 between them. The inner rim of hole 30 is received in groove 42. Two metallic bushes 22, 26 are inserted into the rubber grommet, one from each end. Each of the metal bushes has a flange which stops complete insertion of the bushes into the grommet: as a result there is a slight gap inside the grommet between the ends of the two bushes. The metal bushes are present primarily for assembly reasons and to strengthen the mounting. A bolt 27 passes through the rubber and metallic bushes and into bore 21 in the head-disk assembly enclosure casting. The access direction is orthogonal to the plane of the flexures—i.e. parallel to the direction in which the flexures are most pliant. One of the original design requirements for the mount is sketched in curve A in FIG. 5. This shows the allowable gain at the mount frequency if external vibrations are not to induce head positioning errors whilst track following. The closed-loop servo system used for controlling the actuator includes an integrator with a corner frequency of about 50 Hz. This effectively limits the overall bandwidth of the closed-loop servo system, explaining why the vibration tolerance increase rapidly below this frequency. Initially, relatively stiff rubber grommets were used for mounting the head-disk enclosure, providing a mount frequency of over 100 Hz. However, the track following performance with these mounts was found to be unsatisfactory, since external vibrations with frequencies outside the servo bandwidth but below the mount frequency (i.e.: typically in the range 50–100 Hz) were not attenuated by the mounts, yet could not be followed using the servo. Furthermore, a stiff mounting provided inadequate damping at certain temperatures, and also, at high temperatures, the torsional resonance was too close to the disk rotation speed, causing problems for the spindle motor servo control system.

A grommet mounting with a mount frequency less than the servo bandwidth was then tried so as to reduce this susceptibility to external vibrations by moving under the more tolerant region of curve A. Rubber grommet mounting with a mount frequency of about 40 Hz and a transfer function as shown by curve B were obtained. Although these could satisfy the external vibration requirement of curve A, severe problems remained. It was only possible to achieve the necessary damping by using mounts whose stiffness, and hence mount frequency, varied significantly over the disk drive operating temperature range. Furthermore, the grommets had a low side stiffness (i.e. perpendicular to the access direction) and required more sway space in this plane than was available. Another difficulty was the low rotational frequency of the mount, which was troublesome on account of the low bandwidth of the disk drive motor. Finally, it was found that during a seek operation, the head-disk enclosure casting moved in reaction to the motion of the actuator, which made it difficult to position the heads quickly and precisely.

Although no rubber grommet mounting was found that could answer all the above problems, they are successfully overcome by the flexure isolation mount of FIGS. 3 and 4. The transfer function in the access direction for this mount is shown as curve C in FIG. 5, and it can be seen that it easily satisfies the external vibration requirements. The low mount frequency of the flexure mount of around 20 Hz also means that the servo is much more capable of compensating for any movement of the head-disk enclosure in reaction to actuator seeks.

The constrained layer flexures 23 comprise two layers of steel with an intervening layer of viscoelastic rubber. The central layer of rubber acts as a damping agent to remove the energy of any vibrations. Each flexure is riveted top and bottom to the bracket 25 on the support frame. To obtain the low mount frequency, the flexures are elongated in shape. In fact, by folding each flexure back on itself the effective elongation has been artificially increased, lowering the mount frequency still further. The mount frequency is much higher however orthogonal to the access direction and for rotational vibrations, which reduces the necessary amount of sway space and avoids problems with the disk drive motor.

The rubber grommets 24 are useful primarily for fragility performance, adding some flexibility for motion perpendicular to the access direction, and so function essentially as shock mounts. They both increase the buckling load of the flexure, and ensure that this buckling load is not reached. The grommets are also of great use for preventing the flexure from bending too greatly and coming into hard contact with support bracket. Instead, flange 43 acts as a snubber, so that if the flexure gives too far to the right in FIG. 4, the flange is sandwiched between the flexure and the bracket, increasing stiffness, but without the fragility problems that would arise should the flexure come into direct contact with the bracket.

We claim:

1. A magnetic disk file apparatus comprising:
   a frame;
   a head-disk enclosure further including;
     a disk stack assembly; and
     an actuator; and
   a plurality of isolation mounts attached to said frame and supporting said head-disk enclosure within said frame, each of said isolation mounts including a flexure having constrained layers therein, said flexure also attached to said frame.

2. The magnetic disk file of claim 1, wherein said actuator is a linear actuator and each of said flexures is most pliant in a direction parallel to the access direction of said linear actuator.

3. The magnetic disk file of claim 2 wherein said actuator is controlled by a closed-loop servo system, and wherein the mount frequency in the access direction of said head-disk enclosure is sufficiently low so that vibrations at frequencies outside the bandwidth of said closed-loop servo system are attenuated by said isolation mounts.

4. The magnetic disk file of claim 1, wherein each of said flexure has a planar elongated form.

5. The magnetic disk file of claim 1, wherein said constrained layers within each of said flexures comprises a layer of viscoelastic rubber sandwiched between two layers of steel.

6. The magnetic disk file of claim 4, wherein each of said flexures has an aperture therein, said isolation mount further includes a resilient grommet located in said aperture, said grommet having an opening therein, said head-disk enclosure being supported by a bolt that passes through the opening in said grommet.

7. The magnetic disk file of claim 6, wherein said resilient grommet includes a flange between the ends of the grommet, said flange located between said flexure and said frame so as to prevent contact between said frame and said flexure in the case of excessive displacement of said head-disk enclosure.

8. The magnetic disk file of claim 7, wherein each of said flexures has an H-shaped frame, said aperture located within the central cross-piece of said H-shaped frame; said H-shaped frame having additional cross-pieces at the top and the bottom, each cross-piece having tab for attachment to said frame of said magnetic disk file.

9. The magnetic disk file as claimed in claim 8, wherein said head-disk enclosure is supported in said magnetic disk file frame by four of said isolation mounts.

* * * * *